(12) United States Patent
Benesch et al.

(10) Patent No.: US 8,568,513 B2
(45) Date of Patent: Oct. 29, 2013

(54) SYSTEMS AND METHODS FOR PURIFYING UNSATURATED HYDROCARBON(S), AND COMPOSITIONS RESULTING THEREFROM

(75) Inventors: Robert Benesch, Chicago, IL (US); Eric Coffre, Limours (FR); Aurelie Grimberg, Versailles (FR); Tracey Jacksier, Lisle, IL (US); Malik Haouchine, Chicago, IL (US)

(73) Assignees: American Air Liquide, Inc., Houston, TX (US); L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1400 days.

(21) Appl. No.: 11/091,737

(22) Filed: Mar. 28, 2005

(65) Prior Publication Data

US 2005/0247196 A1    Nov. 10, 2005

Related U.S. Application Data

(60) Provisional application No. 60/556,862, filed on Mar. 26, 2004.

(51) Int. Cl.
| | | |
|---|---|---|
| *B01D 53/02* | (2006.01) | |
| *C07C 7/152* | (2006.01) | |
| *C07C 7/12* | (2006.01) | |

(52) U.S. Cl.
USPC ............................. 95/117; 585/850; 585/820

(58) Field of Classification Search
USPC .................................... 95/117; 585/850, 820
See application file for complete search history.

(56) References Cited

U.S. PATENT DOCUMENTS

| | | | | |
|---|---|---|---|---|
| 1,909,811 | A | * | 5/1933 | Connolly ........................ 558/40 |
| 2,497,761 | A | * | 2/1950 | Clark ............................. 518/705 |
| 2,837,587 | A | * | 6/1958 | Hogan et al. ................. 585/251 |
| 2,938,934 | A | * | 5/1960 | Williams ...................... 585/259 |
| 2,987,486 | A | * | 6/1961 | Carr ................................ 502/49 |
| 3,555,787 | A | * | 1/1971 | Lustig ............................ 96/124 |
| 3,989,751 | A | * | 11/1976 | Forster et al. ................. 562/890 |
| 4,795,545 | A | * | 1/1989 | Schmidt .......................... 208/91 |
| 5,081,325 | A | * | 1/1992 | Haynal et al. ................. 585/820 |
| 5,096,470 | A | * | 3/1992 | Krishnamurthy .............. 95/102 |
| 5,157,204 | A | * | 10/1992 | Brown et al. ................. 585/850 |
| 5,262,547 | A | * | 11/1993 | Ramachandran et al. ..... 549/262 |
| 5,417,947 | A | * | 5/1995 | Hertl et al. ..................... 423/212 |
| 6,069,288 | A | * | 5/2000 | Ou et al. ........................ 585/800 |
| 2001/0009125 | A1 | * | 7/2001 | Monereau et al. .............. 95/117 |
| 2002/0009404 | A1 | * | 1/2002 | Tsybulevskiy et al. .. 423/244.04 |
| 2003/0172808 | A1 | * | 9/2003 | Le Bec .............................. 95/96 |

OTHER PUBLICATIONS

BASF Technical Bulletin "*BASF Catalysts: FAQ on Catalyst R 3-11*".
BASF Technical Bulletin "*BASF Catalysts: R 3-15*".
"*Experimental Study on Oxygen and Water Removal from Gaseous Streams for Future Gas Systems in LHC Detectors*", G. Baptista, M. Bosteels, S. Ilie, C. Schafer: CERN, Geneva Switzerland.

* cited by examiner

*Primary Examiner* — Amber Orlando
(74) *Attorney, Agent, or Firm* — Allen E. White; Christopher J. Cronin

(57) ABSTRACT

A purification process has been developed that allows the removal of several different impurities from unsaturated hydrocarbons. The purification process uses various adsorbents and metal oxides or getters to accomplish the purification. The process is capable of removing the following impurities: $SO_2$, $H_2O$, $O_2$, $CO_2$ and CO.

21 Claims, 7 Drawing Sheets

SYSTEMS AND METHODS FOR PURIFYING UNSATURATED HYDROCARBON(S), AND COMPOSITIONS RESULTING THEREFROM

CROSS-REFERENCE TO RELATED APPLICATIONS

This application claims the benefit under 35 U.S.C. §119(e) to provisional application No. 60/556,862 filed Mar. 26, 2004, the entire contents of which are incorporated herein by reference.

BACKGROUND

The invention is directed to purification of unsaturated hydrocarbons. More particularly, the invention is directed to preparation of purified hydrocarbons resulting in low levels of reactive gases.

Low-level calibration standards including a relatively low concentration of the analyte of interest within a matrix gas are often made by diluting a pure gas of the analyte with the matrix gas. At low levels (<10 ppm), the calibration standard is essentially the matrix gas with an impurity in it, that being the analyte. As a result, any other impurities that were in the matrix gas will essentially be in the calibration standard at essentially the same concentration levels. This gives rise to a problem if the analyte is also present as an impurity in the matrix gas. For instance, it would be nontrivial to make a calibration standard such as 100 ppb of carbon monoxide (CO) in balance ethylene ($C_2H_4$) if there existed 150 ppb of CO in the $C_2H_4$ to begin with. In order to make such a mixture, the analyte concentration in the starting matrix gas would have to be less than in the finished calibration standard.

It is also possible that the impurities in the matrix gas may react with the analyte cause the calibration mixture to be unstable. As an example, hydrogen sulfide ($H_2S$) is thermodynamically unstable in the presence of oxygen ($O_2$), and given enough time, the $H_2S$ will react with the $O_2$ to form hydrogen ($H_2$). In summary, in the presence of particular impurities in a matrix gas, the analyte will react and the calibration standard will be degraded, which will give rise to problems when trying to produce low-level calibration standards. To eliminate such problems one should use highly purified matrix gases.

A common matrix gas is one containing one or more unsaturated hydrocarbons. Many solutions for purifying these matrix gases exist.

G. Baptista et al. proposed removal of oxygen and moisture from gases, but they do not offer solutions to purify unsaturated hydrocarbons. ("Experimental study on oxygen and water removal from gaseous streams for future gas systems in LHC detectors", G. Baptista, M. Bosteels, S. Ilie, C. Schafer: CERN, Geneva Switzerland). Furthermore, they do not suggest methods for removing sulfur dioxide, carbonyl sulfide, carbon monoxide, or carbon dioxide from gases, much less from unsaturated hydrocarbons.

BASF Technical Bulletin "BASF Catalysts: FAQ on Catalyst R 3-11" discloses a tableted catalyst containing finely dispersed copper in an accessible, high surface area, pore structure designed for removal of oxygen, hydrogen, and CO from process streams. However, they do not offer solutions to purify unsaturated hydrocarbons. Furthermore, they do not suggest methods for removing sulfur dioxide, carbonyl sulfide, carbon dioxide or moisture from gases, much less from unsaturated hydrocarbons.

BASF Technical Bulletin "BASF Catalysts: R 3-11 G" discloses a tableted catalyst including highly dispersed and stabilized CuO (at approximately 35% wt.) on a silica support with special promoters to enhance activity and stability. It further discloses removal of of oxygen, hydrogen, and CO. However, they do not offer solutions to purify unsaturated hydrocarbons. Furthermore, they do not suggest methods for removing sulfur dioxide, carbonyl sulfide, carbon dioxide or moisture from gases, much less from unsaturated hydrocarbons.

BASF Technical Bulletin "BASF Catalysts: R 3-15" discloses a tableted catalyst including 40% wt. of CuO, 40% wt. ZnO, and 20% wt. $Al_2O_3$. It further discloses removal of oxygen, acetylene, carbonyl sulfide, hydrogen, and CO. However, it discloses removal of olefins catalytically if hydrogen is available. They do not disclose unsaturated hydrocarbon purification. Indeed, when hydrogen is available, olefins are catalytically removed. Furthermore, they do not suggest methods for removing sulfur dioxide, carbon dioxide or moisture from gases, much less from unsaturated hydrocarbons.

Thus, those skilled in the art will recognize that there is a need for a method to purify unsaturated hydrocarbons, including removal of moisture, oxygen, carbon dioxide, carbon monoxide and sulfur dioxide. They will also recognize a need for producing a purified unsaturated hydrocarbon gases so that low level gas calibration mixtures can be achieved.

SUMMARY OF THE INVENTION

A purification process has been developed that allows for the removal of several different impurities from unsaturated hydrocarbons. The purification process uses various adsorbents and metal oxides to accomplish the purification. The process is capable of removing the following impurities: $H_2S$, R—SH (wherein R is an alkyl, aryl, oxygen, hydroxyl, amine, aminosilane, or alcohol), $H_2O$, $O_2$, $CO_2$, and CO, $SO_2$, COS. One purification step involves the removal of $H_2O$ using an adsorbent. Another purification step involves the removal of $O_2$ using a metal oxide that has been reduced. Another purification step involves the elimination of CO using a metal oxide that has been oxidized. Another purification step(s) involves the removal of $CO_2$ and $SO_2$ using a molecular sieve.

DESCRIPTION OF PREFERRED EMBODIMENTS

According to the method of the invention, impure, unsaturated hydrocarbon gases, typically ethylene or propylene, are purified to a level of purity satisfactory for their use as matrix gases in low-level calibration standards. The calibration standards that are of interest include the following analytes: $H_2S$, R—SH (wherein R is an alkyl, aryl, oxygen, hydroxyl, amine, aminosilane, or alcohol), $SO_2$, COS, R—SH, $H_2O$, CO and $CO_2$. As a result, the afore mentioned compounds must be removed from the ethylene and propylene. Oxygen and $H_2O$ also need to be removed because they may give rise to stability problems. The invention uses various adsorbents and getters to perform the purification.

Figure 1:
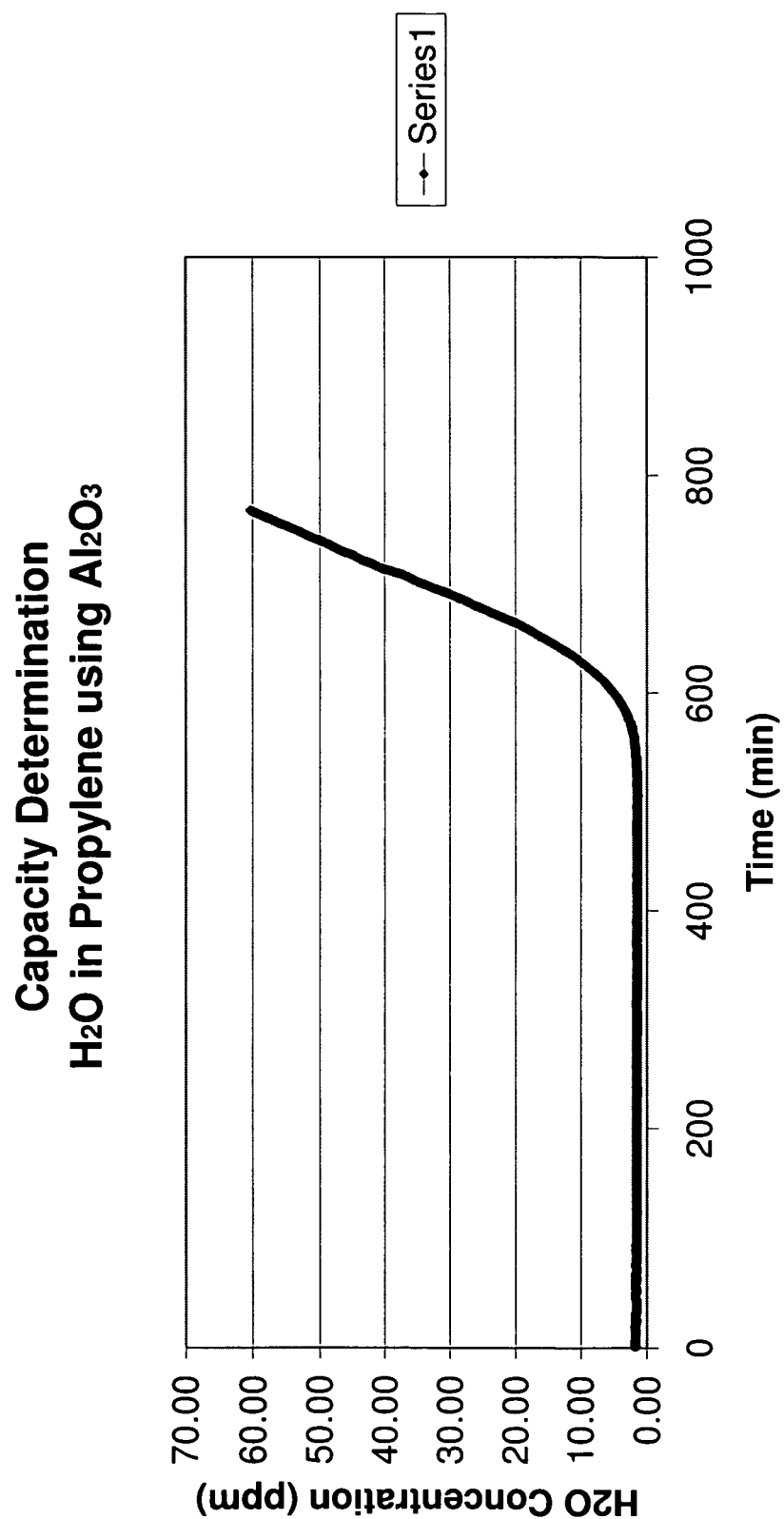
FIG. 1 is a graph showing the capacity determination of removal of moisture in propylene using an $Al_2O_3$ absorbent.
Figure 2:
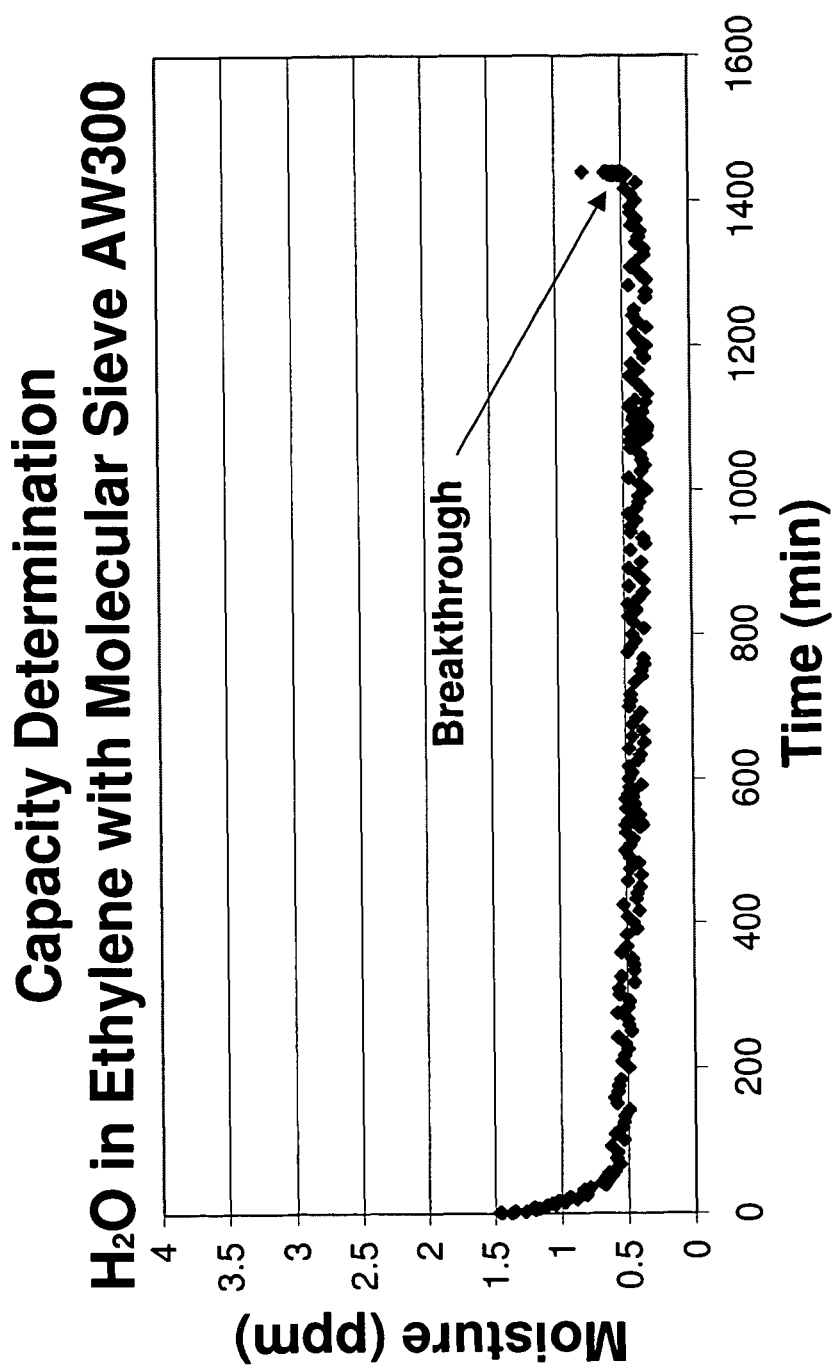
FIG. 2 is a graph showing the capacity determination of removal of moisture in ethylene using a molecular sieve.
Figure 3:
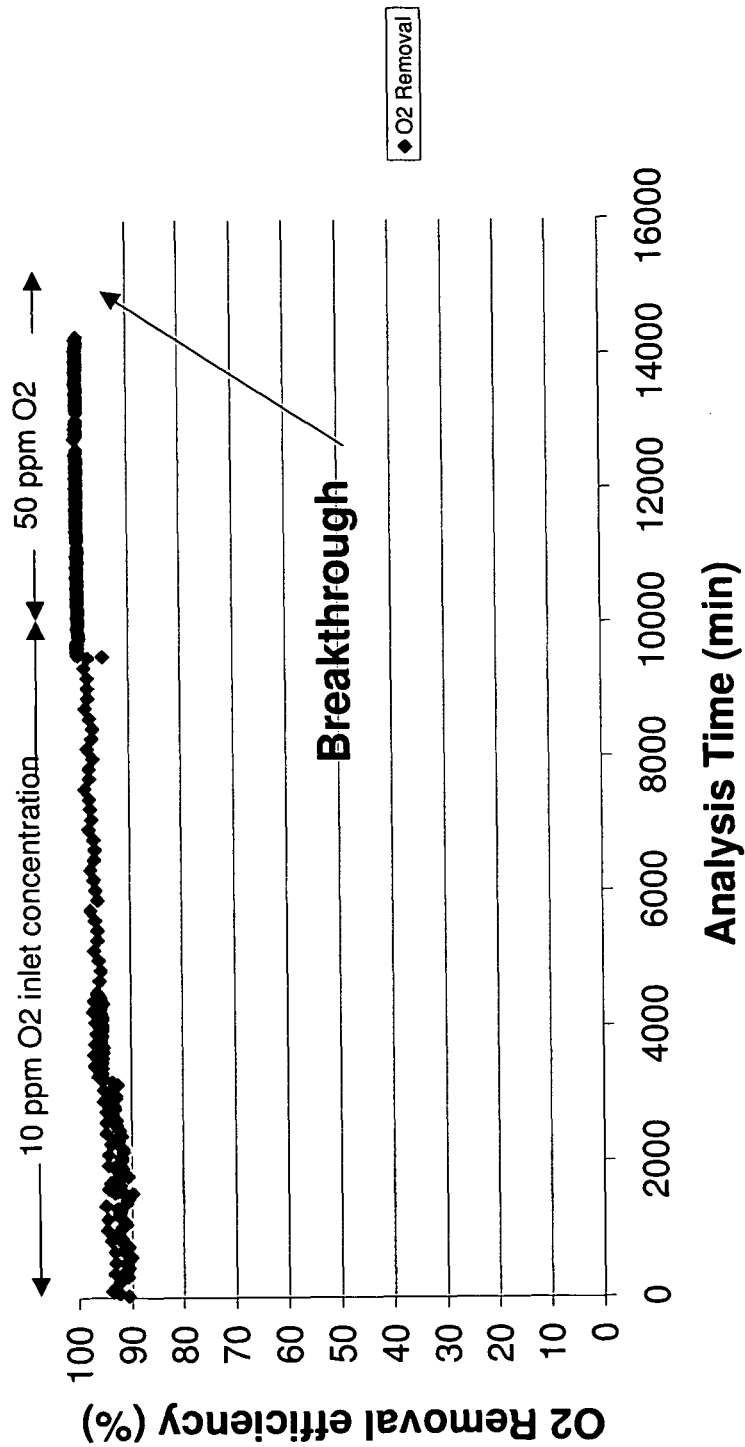
FIG. 3 is a graph showing the capacity determination of removal of oxygen in ethylene using copper oxide on an alumina support.
Figure 4:
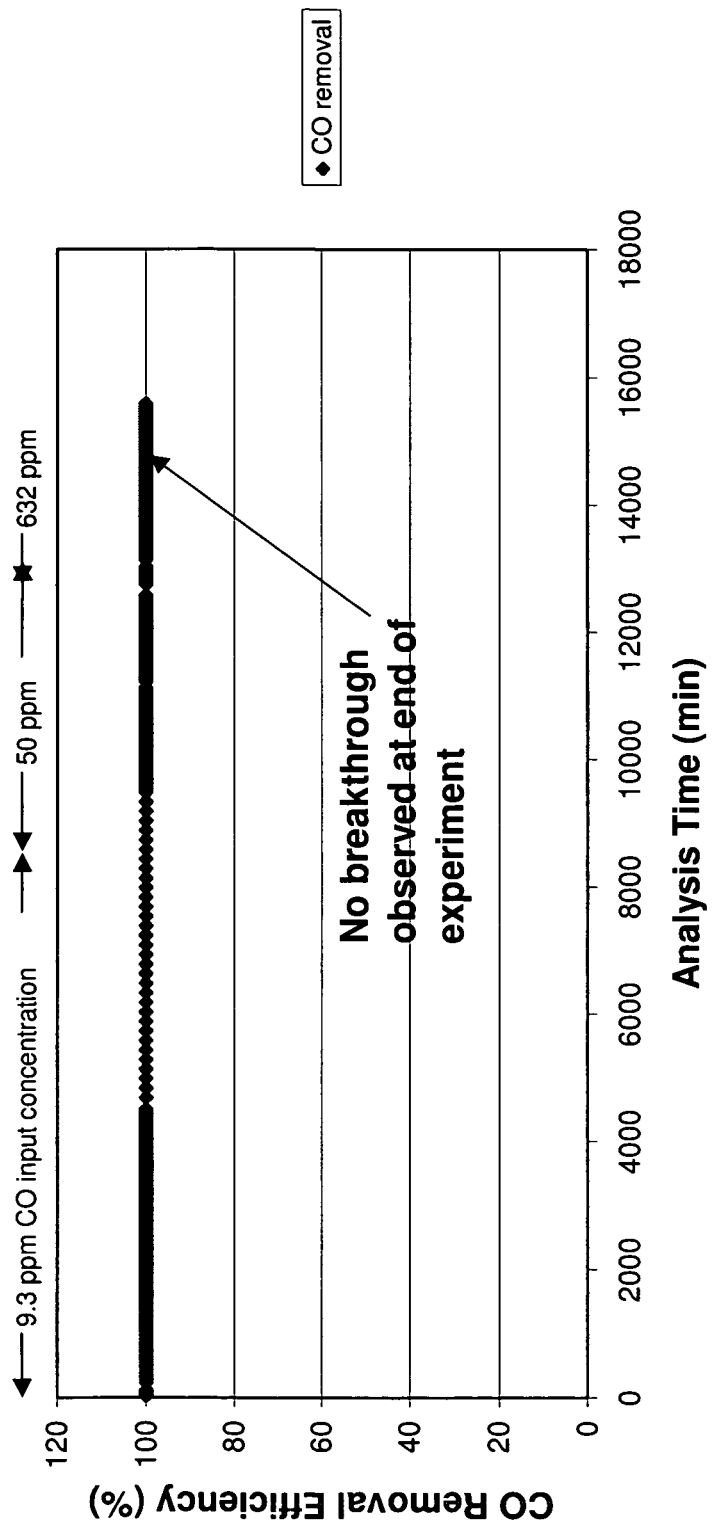
FIG. 4 is a graph showing the capacity determination of carbon monoxide conversion in ethylene using a mixture of copper oxide and manganese oxide.
Figure 5:
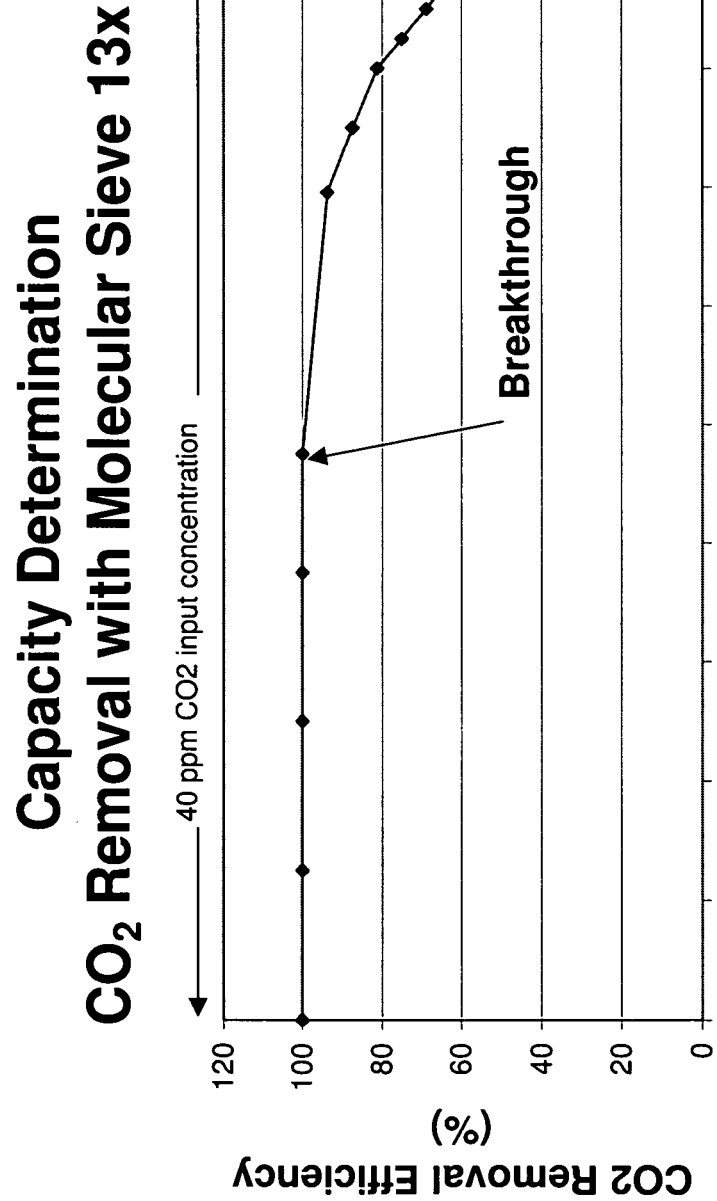
FIG. 5 is a graph showing the capacity determination of removal of $CO_2$ from ethylene using a molecular sieve 13X.
Figure 6:
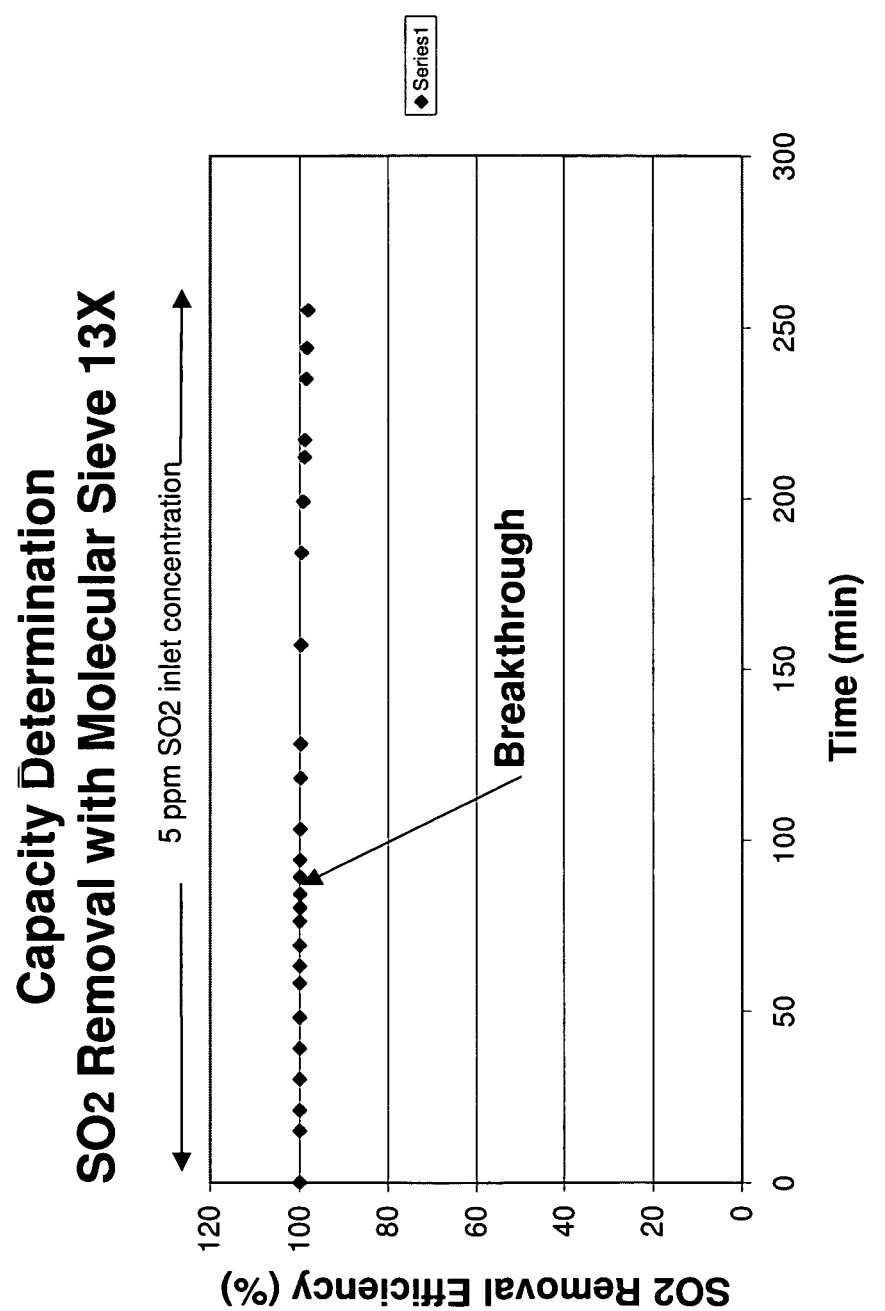
FIG. 6 is a graph showing the capacity determination of removal of $SO_2$ from ethylene using a molecular sieve 13X.
Figure 7:
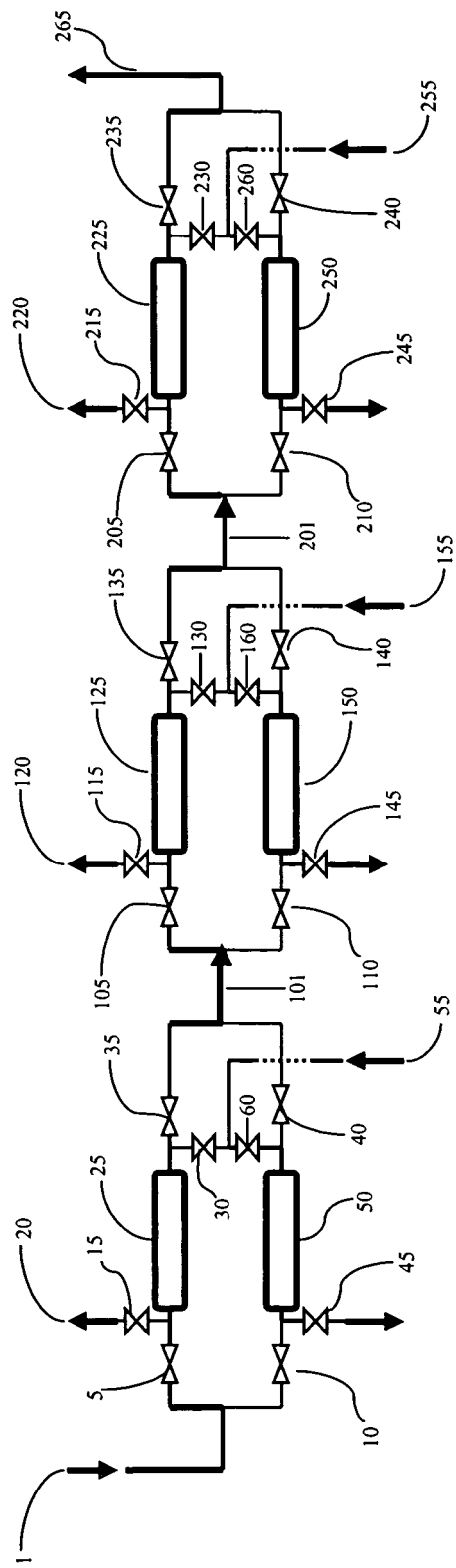
FIG. 7 is a schematic of an exemplary system according to the invention.

As best illustrated in FIG. 7, an exemplary purification system for performing the invention includes a first purification cartridges 25, 60, second purification cartridges 125, 150, and third purification cartridges 225, 250. It further includes a source of the impure unsaturated hydrocarbon gas mixture 1, a source of an hydrogen-containing gas 55 for regenerating the first purification cartridges 25, 60, a source of oxygen-containing gas 155 for regenerating the second purification cartridges 125, 150, and a source of a regenerating gas for regenerating the third purification cartridges 225, 250. It also includes valves 5, 10, 15, 30, 35, 40, 45, 105, 110, 115, 130, 135, 140, 145, and 205, 210, 215, 230, 235, 240, and 245, of which one of ordinary skill in the art will understand may be actuated manually, remotely and/or automatically.

In a first step of operating the system, valves 5 and 35 are actuated to, or allowed to remain in, an open position, and valves 10, 30, and 40 are actuated to, or allowed to remain in a closed position in order to allow the impure unsaturated hydrocarbon (typically ethylene or propylene) gas mixture 1 to flow through first purification cartridge 25.

The first purification cartridges 25, 50 contains one or more metal oxides. If the metal oxide(s) is not spent, it reacts with the oxygen in the impure gas mixture 1 to eliminate at least some of it. In the process of doing so, a stoichiometric amount of the metal oxide(s) corresponding to the oxygen is oxidized to a higher oxidation state as the oxygen is correspondingly consumed. Those of ordinary skill in the art will understand that when the metal oxide(s) is used to eliminate oxygen, spent means that substantially all of the metal oxide(s) has been oxidized to a higher oxidation state, thereby substantially reducing its effectiveness in eliminating the oxygen.

Preferably, the metal oxide(s) is either $Cu_2O$ on an activated alumina (obtainable outside the U.S. under the trade name Carulite® from Carus Chemical Company) support or a mixture of $Cu_2O$ and MnO (obtainable under the trade name Hopcalite® from X). One of ordinary skill in the art will understand that activated alumina is a highly porous, granulated aluminum oxide. When the purification cartridges 25, 50 include $Cu_2O$ on an alumina support, the oxygen reacts with the $Cu_2O$ to oxidize it to CuO. When the purification cartridges 25, 50 include a mixture of $Cu_2O$ and MnO, the oxygen reacts with the $Cu_2O$ and MnO to oxidize them to CuO and $MnO_2$, respectively. Other metal oxides suitable for first purification cartridges 25, 50 include nickel and iron oxides.

As best shown in FIG. 7, while the impure unsaturated hydrocarbon gas mixture is flowing through purification cartridge 25, valves 45, 60 may actuated to, or allowed to remain in, an open position in order to allow the hydrogen-containing gas 55 to flow through first purification cartridge 50, while it is heated, and thereby regenerate it. This is desirable when the metal oxide(s) in first purification cartridge 50 is spent. The hydrogen in the hydrogen-containing gas 55 reacts with the CuO, or mixture of CuO and $MnO_2$, to reduce them to $Cu_2O$, or $Cu_2O$ and MnO and produce water which is carried off by the flow of the hydrogen-containing gas 55. While the flow rate for the hydrogen-containing gas 55 depends upon the capacity of the metal oxide in the purification cartridge, the extent to which it is spent, and the concentration of the hydrogen therein, a preferred flow rate is about 5 liters/min. Preferred hydrogen-containing gases include nitrogen containing a minor amount of hydrogen, preferably about 5-6% hydrogen. Preferably, the first purification cartridge 50 is heated from about 200° C. to about 500° C. during regeneration.

As best illustrated by FIG. 7, when purification cartridge 25 is spent and purification cartridge 50 is regenerated, valves 5, 10, 15, 30, 35, 40, 45, and 60 are acutated such that those which were closed become open and those which were open become closed. In this configuration, the hydrocarbon-containing gas 1 is allowed to flow through first purification cartridge 50, while first purification cartridge 25 is regenerated in the manner described above. One of ordinary skill in the art will understand how much of the hydrocarbon-containing gas 1 will cause the metal oxide(s) in the purification cartridges 25, 50 to become spent, and how much hydrogen-containing gas 55 will regenerate the metal oxide(s).

While the above configuration and operation is preferred, one of ordinary skill in the art will understand that only one purification cartridge 25 or 50 is needed to purify the hydrocarbon-containing gas 1. In that case, the purification cartridge 25 or 50 may be placed offline in order to regenerate it with hydrogen-containing gas 55.

In a second step of operating the preferred system, valves 105 and 135 are actuated to, or allowed to remain in, an open position, and valves 110, 130, and 140 are actuated to, or allowed to remain in a closed position in order to allow the hydrocarbon-containing gas 1 purified by first purification cartridges 25, 50 to flow through second purification cartridge 125.

The second purification cartridges 125, 150 contains one or more metal oxides. If the metal oxide(s) is not spent, it reacts with the carbon monoxide in the impure gas mixture 1 exiting the first purification cartridges 25, 50 to eliminate/oxidize at least some of the carbon monoxide. Preferably, the second purification cartridge 125 is maintained at about 150° C. thereby enhancing elimination/oxidation of the carbon monoxide. In the process of doing so, a stoichiometric amount of the metal oxide(s) corresponding to the carbon monoxide is reduced to a lower oxidation state. Those of ordinary skill in the art will understand that when the metal oxide(s) is used to eliminate/oxidize carbon monoxide, spent means that substantially all of the metal oxide(s) has been reduced to a lower oxidation state, thereby substantially reducing its effectiveness in eliminating/oxidizing the carbon-monoxide.

As best shown in FIG. 7, the metal oxide(s) in second purification cartridges 125, 150 may be the same as, or different from, the metal oxide(s) of the first purification cartridges 25, 50. Preferably, the metal oxide(s) for use in the second purification cartridges 125, 150 is a mixture of CuO and $MnO_2$ sold under the brand name Carulite 300® and available from Carus Chemical (Peru, Ill.). With such metal oxides, the carbon monoxide in the hydrocarbon-containing gas mixture 1 purified by the first purification cartridges 25, 50 reacts with the CuO and $MnO_2$ to oxidize the carbon monoxide to carbon dioxide and reduce the CuO and $MnO_2$ to $Cu_2O$ and MnO. Other suitable metal oxides for use in the second purification cartridges 125, 150 include nickel and iron oxides. We also believe that such metal oxides may also act to oxidize the hydrogen sulfide in the impure gas mixture 1 to sulfur dioxide, which may later be removed by third purification cartridges 225 or 250.

While the impure unsaturated hydrocarbon gas mixture is flowing through purification cartridge 125, valves 145, 160 may actuated to, or allowed to remain in, an open position in order to allow the oxygen-containing gas 155 to flow through second purification cartridge 150, while it is heated, and thereby regenerate it. This is desirable when the metal oxide (s) in second purification cartridge 150 is spent. The oxygen in the oxygen-containing gas 155 reacts with the $Cu_2O$ and MnO to oxidize them to CuO and $MnO_2$. Preferably, the oxygen-containing gas 155 is oxygen, air, or oxygen-enriched air. When air is used, a flow rate of 5 liters/min for a period of time of about 12 hours per 50 g of the metal oxide(s). During regeneration, the second purification cartridge 150 is preferably heated to about 200° C.

When purification cartridge 125 is spent and purification cartridge 150 is regenerated, valves 105, 110, 115, 130, 135, 140, 145, and 160 are acutated such that those which were closed become open and those which were open become closed. In this configuration, the oxygen-containing gas 155 is allowed to flow through second purification cartridge 150, while second purification cartridge 125 is regenerated in the manner described above. One of ordinary skill in the art will understand how much of the hydrocarbon-containing gas 1 will cause the metal oxide(s) in the purification cartridges 125, 150 to become spent, and how much oxygen-containing gas 155 will regenerate the metal oxide(s).

While the above configuration and operation is preferred, one of ordinary skill in the art will understand that only one purification cartridge 125 or 150 is needed to purify the hydrocarbon-containing gas 1 exiting the first purification cartridge(s) 25 and/or 50. In that case, the purification cartridge 125 or 150 may be placed offline in order to regenerate it with oxygen-containing gas 155.

In a third step of operating the system, valves 205 and 235 are actuated to, or allowed to remain in, an open position, and valves 210, 230, and 240 are actuated to, or allowed to remain in a closed position in order to allow the impure unsaturated hydrocarbon gas mixture 1 to flow through third purification cartridge 225.

The third purification cartridges 225, 250 contain a molecular sieve, that if not spent, will trap water, $SO_2$, and carbon dioxide. Those of ordinary skill in the art will understand that molecular sieves are highly porous zeolites that can adsorb/chemisorb molecules from gases/liquids that are small enough to enter into their pores. Those of ordinary skill in the art will further understand that zeolites are any mineral belonging to the zeolite family of minerals and synthetic compounds characterized by an aluminosilicate tetrahedral framework, ion-exchangeable large cations, and loosely held water molecules permitting reversible dehydration. The general formula can be expressed as $X_y^{1+,2+}Al_x^{3+}Si_{1-x}^{4+}O_2 \cdot nH_2O$, wherein X is a cation. Since the oxygen atoms in the framework are each shared by two tetrahedrons, the (Si, Al):O ratio is exactly 1:2. The amount of large cations (X) present is conditioned by the aluminum/silicon (Al:Si) ratio and the formal charge of these large cations. Typical large cations are the alkalies and alkaline earths such as sodium ($Na^+$), potassium ($K^+$), calcium ($Ca^{2+}$), strontium ($Sr^{2+}$), and barium ($Ba^{2+}$). The large cations, coordinated by framework oxygens and water molecules, reside in large cavities in the crystal structure. See www.accessscience.com.

These types of molecular sieves preferentially adsorb in dependence upon the molecular sieve pore diameter, the kinetic diameter of the adsorbate, the polarity of the adsorbate, and the degree of molecular unsaturation of the adsorbate. The temperature and partial pressure of each component of a gaseous mixture also bear upon the amount of species adsorbed. See G. Baptista, M. Bosteels, S. Ilie, C. Schafer, "Experimental Study on Oxygen and Water Removal from Gaseous Streams for Future Gas Systems in LHC", report from European Organization for Nuclear Research, June 2000. Those of ordinary skill in the art will further understand that when a molecular sieve is used to adsorb an adsorbate, spent means that the adsorption capacity of the molecular sieve for adsorbing the adsorbate of interest is substantially reduced, thereby substantially reducing its effectiveness in adsorbing the adsorbate of interest.

Thus, the molecular sieve should be selected such that it has a pore size enabling it to adsorb at least carbon dioxide, water and sulfur dioxide. Preferably, the pore size enables it to adsorb the foregoing, and additionally, hydrogen sulfide, sulfur-containing compounds of the formula R—SH (wherein R is an alkyl, aryl, oxygen, hydroxyl, amine, aminosilane, or alcohol), and carbonyl sulfide. Preferred molecular sieves for adsorbing each of these species includes molecular sieve 13X available from Sigma-Aldrich (St. Louis, Mo.). Molecular Sieve 13X is a sodium aluminosilicate which in a hydrated form has the formula $Na_2O[(Al_2O_3)(SiO_2)_{2.5}]$. Other suitable molecular sieves include X.

While the impure unsaturated hydrocarbon gas mixture is flowing through purification cartridge 225, valves 245, 260 may actuated to, or allowed to remain in, an open position in order to allow the third purification cartridge regeneration gas 255 to flow through third purification cartridge 250 and regenerate it. This is desirable when the molecular sieve has become spent. In combination with heating, the regeneration gas sweeps out the adsorbates of interest. Preferred regeneration gases include nitrogen, argon, and helium. A preferred flow rates is about 2 Liters per 100 grams of sieve material. One of ordinary skill in the art will appreciate that the flow rates may be adjusted according to the size of the purification system. In other words, the mass of available purification materials corresponds to the allowable flow rates that produce acceptable results. Preferably, the third purification cartridges are heated to from about 120° C. to about 350° C. during regeneration. While the period of time during which the third purification cartridge 250 is being regenerated depends upon the amount of adsorbates in the impure gas mixture 1, and the capacity of the molecular sieve, a preferred regeneration times includes about 12-13 hours. An especially preferred regeneration time is about 12 hrs. per 50 g of molecular sieve material.

When purification cartridge 225 is spent and purification cartridge 250 is regenerated, valves 205, 210, 215, 230, 235, 240, 245, and 260 are acutated such that those which were closed become open and those which were open become closed. In this configuration, the third purification cartridge regeneration gas 255 is allowed to flow through the third purification cartridge 250, while third purification cartridge 225 is regenerated in the manner described above. One of ordinary skill in the art will understand how much of the hydrocarbon-containing gas 1 exiting the second purification cartridges 125, 150 will cause the molecular sieves of the third purification cartridges 225, 250 to become spent and how much of the regeneration gas 255 is needed to regeneration the third purification cartridge 225, 250.

While the above configuration and operation is preferred, one of ordinary skill in the art will understand that only one purification cartridge 225 or 250 is needed to purify the hydrocarbon-containing gas 1 exiting the second purification cartridge(s) 125 and/or 150. In that case, the purification cartridge 225 or 250 may be placed offline in order to regenerate it with regeneration gas 255.

The sequence of the purification cartridges should be selected such that the carbon monoxide is oxidized to carbon dioxide by the second purification cartridges 125, 250 before the carbon dioxide is trapped by the molecular sieves of the third purification cartridges 225, 250. So long as this order is followed, the first purification cartridges 25, 50 need not be upstream of the second purification cartridges 125, 150. Thus, it may be positioned either in between the second and third purification cartridges 125, 150, 225, 250, or downstream of the third purification cartridges 225, 250.

Optionally, one or more additional purification cartridges may be used. For example, an cartridge may be included to preferentially adsorb water at any position in the sequence of the purification cartridges 25, 50, 125, 150, 225, 250. Two preferred cartridges include one containing activated alumina and one containing a molecular sieve obtainable under the Molsiv Adsorbents AW 300 1/8 obtainable from UPO, LLC (Des Plaines, Ill.). The molecular sieve AW 300 is made of sodium potasssium aluminosilicates.

If the additional purification cartridge includes a metal oxide for eliminating oxygen, it is desirable to regenerate the metal oxide using a regeneration gas as described above for first purification cartridges 25, 50. Likewise, if the additional purification cartridge includes a metal oxide for oxidizing carbon monoxide, it is also desirable to regenerate the metal oxide using a regeneration gas as described above for first purification cartridges 125, 150. Similarly, if the additional purification cartridge includes an adsorbent, it is further desirable to regenerate the adsorbent using a regeneration gas as described above for third purification cartridges 225, 250.

Preferred regeneration gases 255 include nitrogen, argon, and helium. Preferred flow rates include 2-5 liters/min. One of ordinary skill in the art will appreciate that the flow rates may be adjusted according to the size of the purification system. In other words, the mass of available purification materials corresponds to the allowable flow rates that produce acceptable results. Preferably, the third purification cartridges are heated to 300-350° C. during regeneration. While the period of time during which the third purification cartridges are being regenerated depends upon the amount of adsorbates in the impure gas mixture 1, and the capacity of the molecular sieve, a preferred regeneration times include 4-12 hours.

EXAMPLES

Example 1

A cartridge containing Aluminum oxide ($Al_2O_3$) was regenerated by passing >5 L/min $N_2$ through it at 350° C. for 4 hours. Propylene with 100 ppm $H_2O$ was purified with the cartridge at room temperature. The detector used was a Dupont 5700 Moisture Analyzer. The purified gas had a $H_2O$ level of 0.05 ppm which was the detection limit of the detector.

Example 2

A molecular sieve AW300 was regenerated by passing >2 L/min $N_2$ through it at a temperature of 300° C. 12 hours for 50 gram of adsorbent. Ethylene with 5,000 ppm $H_2O$ was purified with the sieve at room temperature. The detector used was a Beckman Industrial Trace Moisture Analyzer model 5700. The purified gas had a $H_2O$ level of 0.4 ppm.

Example 3

A sieve containing copper oxide (12%) on an alumina support was regenerated (reducing the copper oxide) by passing 5 L/min of $N_2$ containing 6% $H_2$ at 200° C. to 300° C. for 12 hours per 50 g of the copper oxide/alumina support. Ethylene containing 10 ppm $O_2$ was purified with the cartridge at room temperature. The detector used was a Varian GC equipped with a VICI, Pulse Discharge Ionization Detector (PDHID). The purified gas had an $O_2$ level of 0.9 ppm.

Example 4

A cartridge containing copper oxide (12%) on an alumina support was regenerated (reducing the copper oxide) by passing 5 L/min of $N_2$ containing 6% $H_2$ at 200° C. to 300° C. for 12 hours per 50 g of the copper oxide/alumina support. Ethylene containing 50 ppm $O_2$ was purified with the cartridge at room temperature. The detector used was a Varian GC equipped with a VICI, Pulse Discharge Ionization Detector (PDHID). The purified gas had an $O_2$ level of 0.9 ppm.

Example 5

A cartridge containing a mixture of copper oxide and manganese oxide with the trade name Hopcalite was regenerated (reducing the copper oxide) by flowing 5 L/min of $N_2$ containing 6% $H_2$ at 200° C. to 300° C. for 12 hours for 50 grams of the mixture. Propylene containing 40 ppm of $O_2$ was purified by the cartridge at room temperature. The detector used was a Teledyne, 3060E. The purified gas had an $O_2$ level of <0.03 ppm which was the detection limit of the detector.

Example 6

A cartridge containing a mixture of CuO and $MnO_2$ sold under the brand name Carulite 300® (available from Carus Chemical) was regenerated (oxidizing the CuO and $MnO_2$) by passing 5 L/min of compressed air through it at 200° C. for 12 hours for 50 grams of the CuO and $MnO_2$ material. Propylene containing 40 ppm CO was passed through the cartridge at a temperature in excess of 150° C. The detector used was an Agilent 6890 GC, with VICI, Pulse Discharge Ionization Detector (PDHID). The purified gas had a CO level of <0.03 ppm which was the detection limit of the detector.

Example 7

A cartridge containing a mixture of CuO and $MnO_2$ sold under the brand name Carulite 300° (available from Carus Chemical) was regenerated (oxidizing the CuO and $MnO_2$) by passing 5 L/min of compressed air through it at 200° C. for 12 hours for 50 grams of the CuO and $MnO_2$ material. Ethylene containing 9.3 ppm CO was passed through the cartridge at a temperature in excess of 150° C. The detector used was a Varian GC equipped with a VICI, Pulse Discharge Ionization Detector (PDHID). The purified gas had a CO level of <0.03 ppm which was the detection limit of the detector.

Example 8

A cartridge containing a mixture of CuO and $MnO_2$ sold under the brand name Carulite 300® (available from Carus Chemical) was regenerated (oxidizing the CuO and $MnO_2$) by passing 5 L/min of compressed air through it at 200° C. for 12 hours for 50 grams of the CuO and $MnO_2$ material. Ethylene containing 50 ppm CO was passed through the cartridge at a temperature in excess of 150° C. The detector used was a Varian GC equipped with a VICI, Pulse Discharge Ionization Detector (PDHID). The purified gas had a CO level of <0.03 ppm which was the detection limit of the detector.

Example 9

A cartridge containing a mixture of CuO and $MnO_2$ sold under the brand name Carulite 300® (available from Carus Chemical) was regenerated (oxidizing the CuO and $MnO_2$) by passing 5 L/min of compressed air through it at 200° C. for 12 hours for 50 grams of the CuO and $MnO_2$ material. Ethylene containing 632 ppm CO was passed through the cartridge at a temperature in excess of 150° C. The detector used was a Varian GC equipped with a VICI, Pulse Discharge Ionization Detector (PDHID). The purified gas had a CO level of <0.03 ppm which was the detection limit of the detector.

Example 10

A molecular sieve 13X was regenerated by passing 1 L/min of $N_2$ through it at for 4 hours, followed by the same flow at 220° C. for 1 hour, followed by the same flow at 340° C. for 8 hours. Propylene containing 40 ppm CO2 and 40 ppm CO was purified with the sieve. The detector used was a Varian GC equipped with a VICI, Pulse Discharge Ionization Detector (PDHID). It yielded a CO2 level of <0.01 ppm which was the detection limit of the CO2 detector, and a CO level of <0.03 ppm which was the detection limit of the CO detector.

Example 11

A molecular sieve 13X was regenerated by passing 1 L/min of $N_2$ through it at for 4 hours, followed by the same flow at 220° C. for 1 hour, followed by the same flow at 340° C. for 8 hours. Ethylene containing 40 ppm CO2, 9.3 ppm CO, and 5 ppm SO2 was purified with the sieve. The detector used was a Varian GC equipped with a VICI, Pulse Discharge Ionization Detector (PDHID). It yielded a CO2 level of <0.04 ppm, a CO level of <0.03 ppm, and $SO_2$ level of <0.01. Each of these levels were below the detection limits of the associated detectors.

Example 12

Three cartridges connected to one another in series were used to purify proplylene in the following order: molecular sieve 13X, a cartridge containing a mixture of CuO and $MnO_2$ sold under the brand name Carulite 300®, and a cartridge containing copper oxide (12%) on an alumina support. The first cartridge (molecular sieve 13X) was regenerated by passing $N_2$ through it at 325° C. overnight. The second cartridge (Carulite®) was regenerated by passing air through it at 400° C. overnight. Finally, the third cartridge (containing the copper oxide on the alumina support) was regenerated by passing 5% $H_2$ through it at 300° C. overnight.

During purification, the first, second, and third cartridges were maintained at ambient temperature, 350° C., and ambient temperature, respectively.

The following detectors were used (listed by analyte):

TABLE I

Detectors used in Example 12

| Analyte | Detector | Sensitivity | Minimum Detection Limit |
|---|---|---|---|
| oxygen | Teledyne 6090E Oxygen Analyzer | +/−20 ppb | |
| carbon monoxide | PDHID detector from VICI integrated on an Agilent GC utilizing a packed column from Alltech: MolSieve 5A | | 1.7 ppb |
| carbon dioxide | PDHID detector from VICI integrated on an Agilent GC utilizing a packed column from Alltech: Hayesep Q. | | 1 ppb |
| water | Moisture Analyzer model 5700 from Dupont calibrated with a moisture generator from Kintek | | |
| sulfur dioxide | SCD from Sievers integrated on a Varian GC utilizing a Capillary column from J&W: GS-Gaspro | | 40 ppb |

The initial concentrations (before purification) and final concentrations (after purification) of the analytes are below:

TABLE II

Purification Data

| Analyte | Initial Concentration | Final Concentration | Percent Removed |
|---|---|---|---|
| oxygen | 26 ppm | 0.035 ppm | 99.9 |
| carbon monoxide | 0.796 ppm | 0.008 ppm | 99.0 |
| carbon dioxide | 3.5 ppm | 0.009 ppm | 99.7 |
| water | 57.6 ppm | 1.8 ppm | 96.9 |
| sulfur dioxide | 24.12 ppm | 0.04 ppm | 99.8 |

Example 13

The same three cartridges used in Example 12 were used for this Example to determine the degree to which carbon monoxide, carbon dioxide and moisture were removed, except that the molecular sieve 13X was placed last. The regeneration conditions and detectors were the same as for Example 12. The detectors were calibrated with standards using a nitrogen balance gas. The impure propylene had a moisture level of 57.6 ppm.

First, the propylene was purified with the cartridges and passed into an empty cylinder for later analysis. The purified propylene was then analyzed. More than 99% of the carbon monoxide and carbon dioxide was removed. 91% of the moisture was removed to yield a final moisture concentration of 5.2 ppm. We believe that this level may have been artificially elevated due to the difficulty of adequately drying the collection cylinder to contain the purified propylene for later analysis.

Example 14

Example 13 was repeated except that the propylene was analyzed directly at the exhaust of the cartridges. 96.7% of the moisture was removed to yield a final moisture concentration of 1.9 ppm.

Example 15

Example 14 was repeated except that the detector was calibrated using standards with a propylene balance gas in order to identify any matrix gas effects. Also, an alumina cartridge was integrated in the purification system in series after the first three cartridges. The alumina cartridge was regenerated in a GC oven with the temperature ramp:

30° C. to 120° C. at 5° C./min—hold 60 min
120° C. to 220° C. at 5° C./min—hold 60 min
220° C. to 320° C. at 1° C./min—hold 300 min At an initial propylene moisture concentration of 52.4 ppm, the final moisture concentration obtained by purification using the four cartridges 1.7 ppm, which corresponds to a 96.8% moisture removal.

Example 16

Example 15 was repeated except that the alumina cartridge was placed third after the MnO/CuO cartridge and before the molsieve 13X. This configuration removed 97% of the moisture.

Example 17

Example 16 was repeated and the results were compared to the moisture removal properties of each of the cartridges using the same regeneration processes and detectors. Towards this end, the alumina and molecular sieve cartridges of Example 15 were separately used to purify the propylene. Also, the CuO+CuO/MnO cartridges of Example 15 were combined in series to purify the propylene instead of by themselves. Again, the impure propylene had a moisture concentration of 57.6 ppm.

The final moisture level after all four cartridges was 1.2 ppm. The final moisture level after purification through the alumina cartridge alone was 0.92 ppm. The final moisture level after purification through the molecular sieve 13X cartridge alone was 0.95 ppm. The final moisture level after purification through the combination of the CuO+CuO/MnO cartridges was 496 ppm. Thus, the first two cartridges (CuO and CuO/MnO) generate moisture.

Example 18

Propylene having a somewhat indeterminate, low moisture level was then purified. First, it was passed through a moisture generator. A moisture generator is a moisture generating device (supplier: Kin-Tek) which uses the principle of controlled diffusion of moisture through a membrane to generate a known concentration of moisture in a balance gas. This diffusion rate is dependant on temperature. In this case, the temperature is controlled by placing the device in a GC oven at a constant temperature (60° C.). The moisture diffusion rate is known at this temperature, and by varying the flow rate of the diluting gas ($N_2$ or Propylene), it allows us to generate different moisture concentrations. This device was used to calibrate the analyzer and also to generate the 200 ppm moisture in the impure propylene upstream of any moisture removal cartridges.

So, the impure propylene was passed through the moisture generator (to yield an overall moisture level of 200 ppm), then through the alumina and molecular sieve 13X cartridges in series. The final moisture level after purification by both of the above cartridges was 0.8 ppm thereby realizing 99.6% moisture removal. A replicate experiment also yielded 99.6% moisture removal.

Example 19

Example 18 was repeated except that both the CuO+CuO/MnO cartridges of Example 15 were inserted first and second, respectively, upstream of the alumina and molecular sieve 13X cartridges. The overall moisture removal rate was again 99.6%.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of purifying an impure gas mixture comprising an unsaturated hydrocarbon and undesired impurities, the undesired impurities comprising moisture, oxygen, carbon monoxide, carbon dioxide, and sulfur dioxide, comprising the steps of:
   a) providing a source of the impure gas mixture;
   b) providing first, second and third purification cartridges, wherein:
      1) the first purification cartridge comprises an oxide of a first metal,
      2) the second purification cartridge comprises an oxide of a second metal, the first and second metals being the same or different, and
      3) the third purification cartridge comprises a molecular sieve, the first, second and third purification cartridges being in fluid communication;
   c) allowing the impure gas mixture to flow through the first purification cartridge, thereby oxidizing the oxide of the first metal from an initial oxidation state and eliminating at least some of the oxygen;
   d) allowing the impure gas mixture to flow through the second purification cartridge, thereby reducing the oxide of the second metal from an initial oxidation state and oxidizing at least some of the carbon monoxide into carbon dioxide; and
   e) allowing the impure gas mixture to flow through the third purification cartridge, thereby trapping at least some of each of the moisture, carbon dioxide, and sulfur dioxide in the molecular sieve of the third purification cartridge, wherein after steps c, d and e are performed, the impure gas mixture has decreased amounts of carbon monoxide, oxygen, moisture, carbon dioxide, and sulfur dioxide.

2. The method of claim 1, wherein the unsaturated hydrocarbon is present in the impure gas mixture at a concentration of at least 99% by wt.

3. The method of claim 1, wherein the unsaturated hydrocarbon is ethylene.

4. The method of claim 1, wherein the unsaturated hydrocarbon is propylene.

5. The method of claim 1, wherein the method is performed in the sequence of step c), step d), and step e).

6. The method of claim 1, wherein the method is performed in the sequence of step d), step e), and step c).

7. The method of claim 1, wherein the method is performed in the sequence of step d), step c), and step e).

8. The method of claim 1, wherein the first metal is copper.

9. The method of claim 1, wherein the second metal is copper.

10. The method of claim 1, wherein the first purification cartridge further comprises an oxide of manganese, the first metal being copper.

11. The method of claim 1, wherein the second purification cartridge further comprises an oxide of manganese, the second metal being copper.

12. The method of claim 1, wherein the molecular sieve of the third purification cartridge is molecular sieve 13X.

13. The method of claim 1, wherein:
   a) the first purification cartridge further comprises an oxide of manganese;
   b) the first metal is copper;

c) the second purification cartridge further comprises an oxide of manganese;
d) the second metal is copper; and
e) the molecular sieve of the third purification cartridge is molecular sieve 13X.

14. The method of claim 1, further comprising the steps of:
   a) providing a fourth purification cartridge comprising molecular sieve made of a material different from that of the molecular sieve of the third purification cartridge; and
   b) allowing the impure gas mixture to flow through the fourth purification cartridge thereby trapping at least some of the moisture, the fourth purification being downstream of the impure gas mixture source and upstream of the first purification cartridge.

15. A method of purifying an impure gas mixture comprising an unsaturated hydrocarbon and undesired impurities, the undesired impurities comprising moisture, oxygen, carbon monoxide, carbon dioxide, and sulfur dioxide, comprising the steps of:
   a) providing a source of the impure gas mixture;
   b) providing first, second and third purification cartridges, wherein:
      1) the first purification cartridge comprises an oxide of a first metal,
      2) the second purification cartridge comprises an oxide of a second metal, the first and second metals being the same or different, and
      3) the third purification cartridge comprises a molecular sieve, the first, second and third purification cartridges being in fluid communication;
   c) allowing the impure gas mixture to flow through the first purification cartridge, thereby oxidizing the oxide of the first metal from an initial oxidation state and eliminating at least some of the oxygen;
   d) allowing the impure gas mixture to flow through the second purification cartridge, thereby reducing the oxide of the second metal from an initial oxidation state and oxidizing at least some of the carbon monoxide into carbon dioxide;
   e) allowing the impure gas mixture to flow through the third purification cartridge, thereby trapping at least some of each of the moisture, carbon dioxide, and sulfur dioxide in the molecular sieve of the third purification cartridge, wherein after steps c, d and e are performed, the impure gas mixture has decreased amounts of carbon monoxide, oxygen, moisture, carbon dioxide, and sulfur dioxide; and
   f) regenerating the first purification cartridge by:
      1) providing a source of a hydrogen-containing gas; and
      2) after the impure gas mixture is allowed to flow through the first purification cartridge, allowing the hydrogen-containing gas to flow through the first purification cartridge in a direction opposite that of the flow of the impure gas mixture through the first purification cartridge, thereby regenerating the first purification cartridge.

16. A method of purifying an impure gas mixture comprising an unsaturated hydrocarbon and undesired impurities, the undesired impurities comprising moisture, oxygen, carbon monoxide, carbon dioxide, and sulfur dioxide, comprising the steps of:
   a) providing a source of the impure gas mixture;
   b) providing first, second and third purification cartridges, wherein:
      1) the first purification cartridge comprises an oxide of a first metal,
      2) the second purification cartridge comprises an oxide of a second metal, the first and second metals being the same or different, and
      3) the third purification cartridge comprises a molecular sieve, the first, second and third purification cartridges being in fluid communication;
   c) allowing the impure gas mixture to flow through the first purification cartridge, thereby oxidizing the oxide of the first metal from an initial oxidation state and eliminating at least some of the oxygen;
   d) allowing the impure gas mixture to flow through the second purification cartridge, thereby reducing the oxide of the second metal from an initial oxidation state and oxidizing at least some of the carbon monoxide into carbon dioxide;
   e) allowing the impure gas mixture to flow through the third purification cartridge, thereby trapping at least some of each of the moisture, carbon dioxide, and sulfur dioxide in the molecular sieve of the third purification cartridge, wherein after steps c, d and e are performed, the impure gas mixture has decreased amounts of carbon monoxide, oxygen, moisture, carbon dioxide, and sulfur dioxide; and
   f) regenerating the second purification cartridge by:
      1) providing a source of a oxygen-containing gas; and
      2) after the impure gas mixture is allowed to flow through the second purification cartridge, allowing the oxygen-containing gas to flow through the second purification cartridge in a direction opposite that of the flow of the impure gas mixture through the second purification cartridge, thereby regenerating the second purification cartridge.

17. A method of purifying an impure gas mixture comprising an unsaturated hydrocarbon and undesired impurities, the undesired impurities comprising moisture, oxygen, carbon monoxide, carbon dioxide, and sulfur dioxide, comprising the steps of:
   a) providing a source of the impure gas mixture;
   b) providing first, second and third purification cartridges, wherein:
      1) the first purification cartridge comprises an oxide of a first metal,
      2) the second purification cartridge comprises an oxide of a second metal, the first and second metals being the same or different, and
      3) the third purification cartridge comprises a molecular sieve, the first, second and third purification cartridges being in fluid communication;
   c) allowing the impure gas mixture to flow through the first purification cartridge, thereby oxidizing the oxide of the first metal from an initial oxidation state and eliminating at least some of the oxygen;
   d) allowing the impure gas mixture to flow through the second purification cartridge, thereby reducing the oxide of the second metal from an initial oxidation state and oxidizing at least some of the carbon monoxide into carbon dioxide;
   e) allowing the impure gas mixture to flow through the third purification cartridge, thereby trapping at least some of each of the moisture, carbon dioxide, and sulfur dioxide in the molecular sieve of the third purification cartridge, wherein after steps c, d and e are performed, the impure gas mixture has decreased amounts of carbon monoxide, oxygen, moisture, carbon dioxide, and sulfur dioxide; and
   f) regenerating the third purification cartridge by:

1) providing a source of a third purification cartridge regenerating gas; and
2) after the impure gas mixture is allowed to flow through the third purification cartridge, allowing the third purification cartridge regenerating gas to flow through the third purification cartridge in a direction opposite that of the flow of the impure gas mixture through the third purification cartridge, thereby regenerating the third purification cartridge.

18. The method of claim 1, wherein the first purification cartridge eliminates greater than 99% of the oxygen in the impure gas mixture.

19. The method of claim 1, wherein the third purification cartridge traps greater than 99% of the carbon dioxide and sulfur dioxide in the impure gas mixture.

20. The method of claim 1, wherein:
   a) the first purification cartridge eliminates greater than 99% of the oxygen in the impure gas mixture; and
   b) the third purification cartridge traps greater than 99% of the carbon dioxide and sulfur dioxide in the impure gas mixture.

21. A method of purifying an impure gas mixture comprising an unsaturated hydrocarbon and undesired impurities, the undesired impurities comprising moisture, oxygen, carbon monoxide, carbon dioxide, and sulfur dioxide, comprising the steps of:
   a) providing a source of the impure gas mixture;
   b) providing a source of a hydrogen-containing gas;
   c) providing a source of an oxygen-containing gas;
   d) providing a source of a third purification cartridge regenerating gas;
   e) providing a purification system for purifying the impure gas mixture, the system comprising first, second, and third purification cartridges, wherein:
      1) the first purification cartridge comprises an inlet, an outlet, and an oxide of a first metal,
      2) the second purification cartridge comprises an inlet, an outlet, and an oxide of a second metal, the first and second metals being the same or different, and
      3) the third purification cartridge comprises an inlet, an outlet, and a molecular sieve;
      4) the first, second and third purification cartridges are in fluid communication;
   f) allowing the impure gas mixture to flow through the first purification cartridge, thereby oxidizing the oxide of the first metal from an initial oxidation state and eliminating at least some of the oxygen;
   g) after the impure gas mixture is allowed to flow through the first purification cartridge, allowing the hydrogen-containing gas to flow through the first purification cartridge in a direction opposite that of the flow of the impure gas mixture through the first purification cartridge, thereby regenerating the first purification cartridge
   h) allowing the impure gas mixture to flow through the second purification cartridge, thereby reducing the oxide of the second metal from an initial oxidation state and oxidizing at least some of the carbon monoxide into carbon dioxide;
   i) after the impure gas mixture is allowed to flow through the second purification cartridge, allowing the oxygen-containing gas to flow through the second purification cartridge in a direction opposite that of the flow of the impure gas mixture through the second purification cartridge, thereby regenerating the second purification cartridge;
   j) allowing the impure gas mixture to flow through the third purification cartridge, thereby trapping at least some of each of the moisture, carbon dioxide, and sulfur dioxide in the molecular sieve of the third purification cartridge; and
   k) after the impure gas mixture is allowed to flow through the third purification cartridge, allowing the third purification cartridge regenerating gas to flow through the third purification cartridge in a direction opposite that of the flow of the impure gas mixture through the third purification cartridge, thereby regenerating the third purification cartridge, wherein:
      1) the impure gas mixture exiting the purification system has an amount of oxygen at least 99% less than the amount of oxygen in the impure gas mixture in the source of the impure gas mixture,
      2) the impure gas mixture exiting the purification system has an amount of carbon dioxide at least 99% less than the amount of carbon dioxide in the impure gas mixture in the source of the impure gas mixture, and
      3) the impure gas mixture exiting the purification system has an amount of sulfur dioxide at least 99% less than the amount of sulfur dioxide in the impure gas mixture in the source of the impure gas mixture.

* * * * *